Oct. 30, 1945.  F. M. ASPIN  2,387,973
INTERNAL-COMBUSTION ENGINE
Filed Sept. 15, 1943

INVENTOR:
Frank M. Aspin
BY
Attorney:— Walter Dunn

Patented Oct. 30, 1945

2,387,973

UNITED STATES PATENT OFFICE 2,387,973

INTERNAL-COMBUSTION ENGINE

Frank Metcalf Aspin, Bury, England

Application September 15, 1943, Serial No. 502,450
In Great Britain June 25, 1942

10 Claims. (Cl. 123—48)

This invention relates to internal combustion engines and is particularly, though not exclusively, applicable to engines of the kind described in my prior Patent No. 2,283,594.

The thermal efficiency of an internal combustion engine varies very considerably with variation of working conditions and in particular it is affected by the throttle control. Generally speaking, all internal combustion engines are designed for an optimum compression ratio, so that, with a full charge under normal working conditions, the maximum power will be obtainable. The power obtainable from the explosion of each charge is, however, dependent on many factors of design in which compression ratio and detonation control are probably predominant, it being recognized that thermal efficiency increases with increase of compression ratio, provided that detonation control can be maintained. The practical determining factor of compression ratio with any given fuel is therefore mainly detonation control.

Internal combustion engines operate most of their time at less than full throttle and therefore seldom at maximum efficiency, because control of the engine power by the usual convenient method of throttling the supply of combustible gases immediately reduces the actual compression which obtains when the charge is ignited and this immediately reduces very substantially the thermal efficiency. For example, in the case of a small car, it is computed that it requires 30 H. P. to propel it at 60 M. P. H., but only 5 H. P. to propel it at 20 M. P. H. It should follow, therefore, that for a journey of 60 miles at the slower speed the engine should require to provide only 15 H. P. hours or half that required at the higher speed and therefore that the fuel consumption should be halved. In actual fact, the fuel consumption at the different speeds will show very little difference, which indicates that the thermal efficiency at the slower speeds has been nearly halved, due to the lowering of the compression at which the charge is ignited, compared with the compression at the higher speeds.

The object of the present invention is an improved construction of engine having means for varying the volume of the compression space, and for effecting such variation proportionally with the volume of the explosive charge.

The invention is particularly applicable to the construction forming the subject of my co-pending applications for Patent Nos. 487,613 and 502,449.

Figure 1:
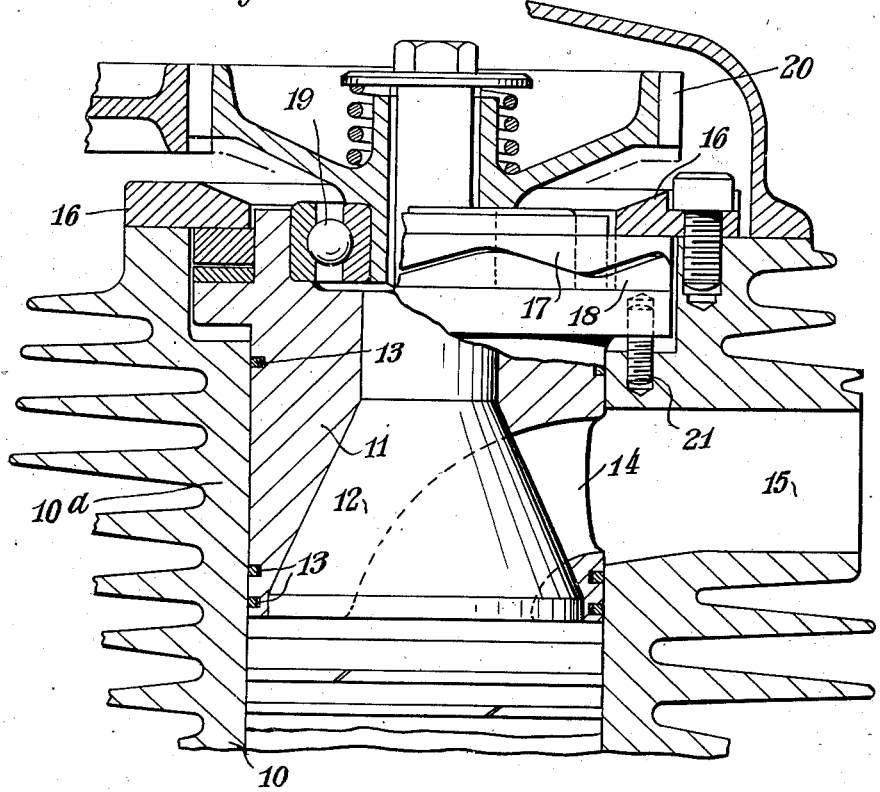
Fig. 1 is a longitudinal section illustrating one example of the invention.

As shown in the drawing, the engine has an extension 10a of the cylinder 10 and a plug-like unit 11 therein embodying the cylinder head and valve 12 with tapered complementary gas sealing and bearing surfaces and an offset combustion space 12' in the valve. The plug-like unit is axially movable in the end of the cylinder and has gas sealing rings 13 above and below its port 14 whilst, as can be seen, the complementary ports, such as 15 in the cylinder extension, are flared so as to provide free passage in whichever position the plug may be located. On the end of the cylinder extension is a thrust plate 16 secured by screws 16¹ and below which is rotatably mounted on part 17 of a face cam. The lower part 18 of the face cam is secured to a flange on the plug 11. The plug 11 carries anti-friction bearings 19 for the driving pinion 20. The plug 11 is restrained from rotation by a locating pin 21.

Figure 2:
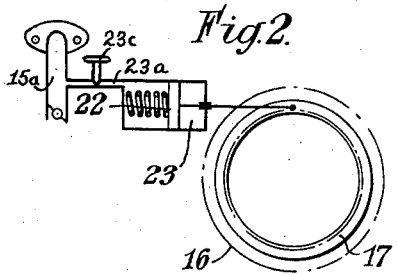
Figs. 2 and 3 are diagrams showing modifications of the invention.

Any suitable means may be provided for rotating the cam 17. For example, as shown in Fig. 2 the axial movement and/or mean location of the plug-like unit 11 is controlled by a piston 22 in a vacuum cylinder 23, together providing a pneumatic actuating mechanism, the pressure in which cylinder varies with the pressure in the induction system of the engine, to the induction pipe 15a of which system one end of the cylinder is connected by a pipe 23a, return movement being provided for example by a spring 23b and the action controlled by any suitable damping means such as a valve 23c.

Thus, as the pressure in the induction system varies as a function of both the engine speed and throttle opening, so the plug-like unit 11 will be moved to decrease or increase the volume of the compression space as some function of the volume of the charge, so that the optimum, or an approximation to the optimum compression ratio, will be obtained at all times and for all conditions of use, especially for the lower, or throttled, engine power output.

Figure 3:
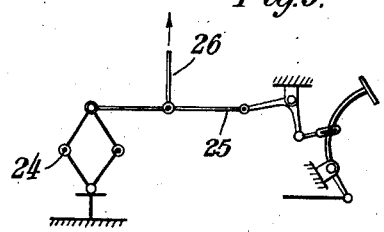

Instead of controlling the movement of the plug-like cylinder head unit by variation of pressure in the induction system, it may be controlled by variation of pressure in the cylinder itself or mechanically as a function of the throttle position only or of both the engine speed and throttle position in such latter case using, for example, as shown in Fig. 3, linkage coupling of a governor 24 and a connection 25 to the throttle control whilst the cam 17 is operated by a connection 26 so arranged that increase of speed and closing of throttle will both operate to move the plug 11 towards the piston and decrease the volume of the compression space.

Figure 4:
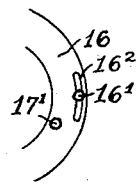
Fig. 4 is a detail view of a modification.

Non-automatic adjustment for the cam construction, could be provided, including means for securing the cam 17 in any desired set position as, for instance as shown in Fig 4, by arranging that the cam 17 is secured by screws 17' to the plate 16 and that such plate has arcuate slots 16² to permit rotational adjustment relative to the securing screw 16'. In a multi-cylinder engine, where automatic adjustment is provided, the cams 17 for each cylinder may be connected together for synchronized movement using any suitable known mechanism.

What I claim is:

1. An internal combustion engine having a cylinder, a plug-like unit axially movable at the combustion end of the cylinder for varying the volume of the combustion space whilst the engine is running and in which engine the volume of the combustible charge supplied to such combustion space is variable, and means for moving the said plug-like unit axially to vary the volume of the said combustion space proportionally with the volume of the said charge, said means including complementary and relatively rotatable face-cams for moving the plug-like unit itself.

2. An internal combustion engine having a cylinder, a plug-like unit axially movable at the combustion end of the cylinder for varying the volume of the combustion space whilst the engine is running and in which engine the volume of the combustible charge supplied to such combustion space is variable, and means for moving the said plug-like unit axially to vary the volume of the said combustion space proportionally with the volume of the said charge, said means including complementary and relatively rotatable face-cams for moving the plug-like unit itself, throttle mechanism for varying the volume of the combustible charge supplied to the engine and coupling means connecting said throttle mechanism to a rotatable face cam.

3. An internal combustion engine having a cylinder, a plug-like unit axially movable at the combustion end of the cylinder, a rotary valve member mounted in the said plug-like unit, means for preventing rotation of the plug-like unit, an off-set combustion space in the rotary valve member, complementary ports in the plug-like unit and in the cylinder and means for moving the said plug-like unit axially for determining the volume of the combustion space in the cylinder of the end of the plug-like unit.

4. An internal combustion engine having a cylinder, a plug-like unit axially movable at the combustion end of the cylinder, a rotary valve member mounted in the said plug-like unit, means for preventing rotation of the plug-like unit, an off-set combustion space in the rotary valve member, complementary ports in the plug-like unit and in the cylinder, gas sealing rings in the plug-like unit located above and below such ports, and means for moving the said plug-like unit axially for determining the volume of the combustion space in the cylinder at the end of the plug-like unit.

5. An internal combustion engine having a cylinder, a plug-like unit axially movable at the combustion end of the cylinder, a rotary valve member mounted in the said plug-like unit, means for preventing rotation of the plug-like unit, an off-set combustion space in the rotary valve member, complementary ports in the plug-like unit and in the cylinder and means for moving the said plug-like unit axially for varying the volume of the combustion space in the cylinder at the end of the said plug-like unit, whilst the engine is running, said means comprising complementary and relatively rotatable face cams.

6. An internal combustion engine having a cylinder, a plug-like unit axially movable at the combustion end of the cylinder, a rotary valve member mounted in the said plug-like unit, means for preventing rotation of the plug-like unit, an off-set combustion space in the rotary valve member, complementary ports in the plug-like unit and in the cylinder and means for moving the said plug-like unit axially for varying the volume of the combustion space proportionally with the volume of combustible charge supply to the engine, said means comprising complementary and relatively rotatable face cams for moving the plug-like unit, throttle mechanism for varying the volume of the combustible supply to the engine and coupling means connecting said throttle mechanism to a rotatable face cam.

7. An internal combustion engine having a cylinder, a plug-like unit axially movable at the combustion end of the cylinder, a rotary valve member mounted in the said plug-like unit, means for preventing rotation of the plug-like unit, an off-set combustion space in the rotary valve member, complementary ports in the plug-like unit and in the cylinder and means for moving the said plug-like unit axially for varying the volume of the combustion space in the cylinder at the end of the said plug-like unit, whilst the engine is running, said means comprising complementary and relatively rotatable face cams in combination with gas sealing rings in the plug-like unit located above and below the said complementary ports.

8. An internal combustion engine having a cylinder, a plug-like unit axially movable at the combustion end of the cylinder, a rotary valve member mounted in the said plug-like unit, means for preventing rotation of the plug-like unit, an off-set combustion space in the rotary valve member, complementary ports in the plug-like unit and in the cylinder and means for moving the said plug-like unit axially for varying the volume of the combustion space proportionally with the volume of combustible charge supply to the engine, said means comprising complementary and relatively rotatable face cams for moving the plug-like unit, throttle mechanism for varying the volume of the combustible supply to the engine and coupling means connecting said throttle mechanism to a rotatable face cam in combination with gas sealing rings in the plug-like unit located above and below the said complementary ports.

9. An internal combustion engine having a cylinder, a plug-like unit axially movable at the combustion end of the cylinder for varying the volume of the combustion space, said plug-like unit having a port, a rotary valve mounted in the plug-like unit and provided with a port complementary to the port in the plug-like unit, and means for effecting axial movement of the plug-like unit when the valve is rotated.

10. An internal combustion engine having a cylinder, a plug-like unit axially movable at the combustion end of the cylinder for varying the volume of the combustion space, said plug-like unit having a port, a rotary valve mounted in the plug-like unit and provided with a port complementary to the port in the plug-like unit, a stationary cam member having a cam face, and a movable cam member connected with the rotary valve and having a cam face engaging the cam face of the stationary cam member for moving the plug-like unit axially when the valve is rotated.

FRANK METCALF ASPIN.